United States Patent [19]

Teagan

[11] 4,232,656
[45] Nov. 11, 1980

[54] INTEGRAL STORAGE COLLECTOR SOLAR HEATING SYSTEM

[75] Inventor: W. Peter Teagan, Acton, Mass.

[73] Assignee: Arthur D. Little, Inc., Cambridge, Mass.

[21] Appl. No.: 19,905

[22] Filed: Mar. 12, 1979

[51] Int. Cl.³ ............................................... F24J 3/02
[52] U.S. Cl. ..................................... 126/420; 126/422; 126/432; 126/433; 126/437; 126/450; 126/452
[58] Field of Search ............... 126/420, 422, 432, 433, 126/450, 437, 436, 452; 237/1 A, 1 R

[56] References Cited

U.S. PATENT DOCUMENTS

| | | | |
|---|---|---|---|
| 1,753,227 | 4/1930 | Wheeler et al. | 126/437 |
| 4,010,734 | 3/1977 | Chayet | 126/437 X |
| 4,080,957 | 3/1978 | Bennett | 126/433 |
| 4,119,087 | 10/1978 | Cook | 126/422 X |
| 4,169,460 | 10/1979 | Popovich et al. | 126/422 |
| 4,184,481 | 1/1980 | Tornquist | 126/422 |

*Primary Examiner*—George T. Hall
*Attorney, Agent, or Firm*—Bessie A. Lepper

[57] ABSTRACT

In an integral storage collector solar heating system, water heated in a conventional hot water heater is first preheated in an integral storage collector. The storage collector includes a heat storing medium, preferably clean water, in a storage tank. Water to be heated is forced by line pressure through heat exchange pipes immersed in the heat storing water. The heat of fusion of the storing water prevents freezing of the line water. To preclude excessive pressure in the heat storage tank with high temperatures of the heat storing water, a heat pipe is provided to act as a large heat leak at about the vaporization temperature of the water. Also, a pressure relief valve is provided. The system avoids freezing and contamination of the water and does not require temperature control circuitry or a pump.

33 Claims, 4 Drawing Figures

INTEGRAL STORAGE COLLECTOR SOLAR HEATING SYSTEM

TECHNICAL FIELD

This invention relates to the solar heating of water.

BACKGROUND ART

In both domestic and industrial applications, preheating of hot water by solar energy is coming into widespread use. Generally a solar collector for absorbing light and converting the light to thermal energy is mounted on a roof. Because use of the hot water is periodic, the heat must be transferred to an insulated storage medium which holds the heat energy for subsequent use.

In early solar water heating systems such as disclosed in U.S. Pat. Nos. 1,747,826 to Gould and 1,753,227 to Wheeler et al. hot water pipes in a solar collector were connected to a hot water storage tank. The heated water flowed into the tank by convection and to that end the solar collector was at a level lower than the water storage tank. Because it is generally preferred to have the solar collector at a high point such as on a roof and the water storage at a low point such as in a basement, such convection systems are not usually practical. Further, unless the solar collector is disconnected at night, cooling of the stored hot water may result. Thus some temperature responsive valve control is required. And once disconnected, if water is then allowed to remain in the collector it is subject to freezing.

A modern adaptation of the older water heating systems is found in U.S. Pat. No. 4,010,734 to Chayet. In that patent a temperature controlled pump is used to pump water from a hot water storage tank to the solar collector. A supplemental electrical heating element is also provided in the storage tank. Such a system requires temperature control circuitry as well as an electrical pump. With periodic turning on and off of the pump, the pump and circuitry are subject to failure. The system also suffers from the freezing problem if water is permitted to remain in the collector on cold nights.

Most conventional solar water heating systems avoid the freezing problem by using a nonfreezing heat transfer fluid. The transfer fluid is pumped in a closed circuit which passes in heat exchange relationship with the water to be heated. At in the Chayet system, temperature controls and a pump are required for the heat transfer fluid. The systems also suffer from the risk of contamination of the hot water with leakage of the nonfreezing heat transfer fluid. Further, such systems are expensive. Heat transfer fluid is much more expensive than plain water, and to avoid contamination of the water and to avoid other leakage of the expensive heat transfer fluid, a very tight and thus expensive fluid transfer system must be provided.

An object of the present invention is to provide a simplified solar water system which does not require a pump or temperature control circuitry and which thus avoids the expense and unreliability of those elements of the system.

A further object of this invention is to provide such a simplified solar heating system which does not present the risk of contamination of the heated water while still avoiding freezing of the water.

Yet another object of this invention is to provide a solar water heating system capable of providing a substantial amount of the heat requirements in a home, office building or the like.

DISCLOSURE OF THE INVENTION

A solar heating system in accordance with the present invention has an integral storage collector exposed to solar illumination. The storage collector includes an absorber for absorbing solar energy, a heat storage medium of large heat capacity and high thermal conductivity for storing the absorbed energy, and a water flow path in heat exchange relationship with the heat storage medium. Water is forced through the water flow path by line pressure and is used directly as a hot water supply.

The heat storage medium is preferably water so that the heat of fusion of the storage medium prevents freezing of the line water.

To avoid high pressures in the heat storage medium with high temperatures, a pressure relief is provided. Preferably, the pressure relief includes a heat pipe which acts as a large heat leak at about the vaporization temperature of the heat storage medium.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

BEST MODE OF CARRYING OUT THE INVENTION

Figure 1:
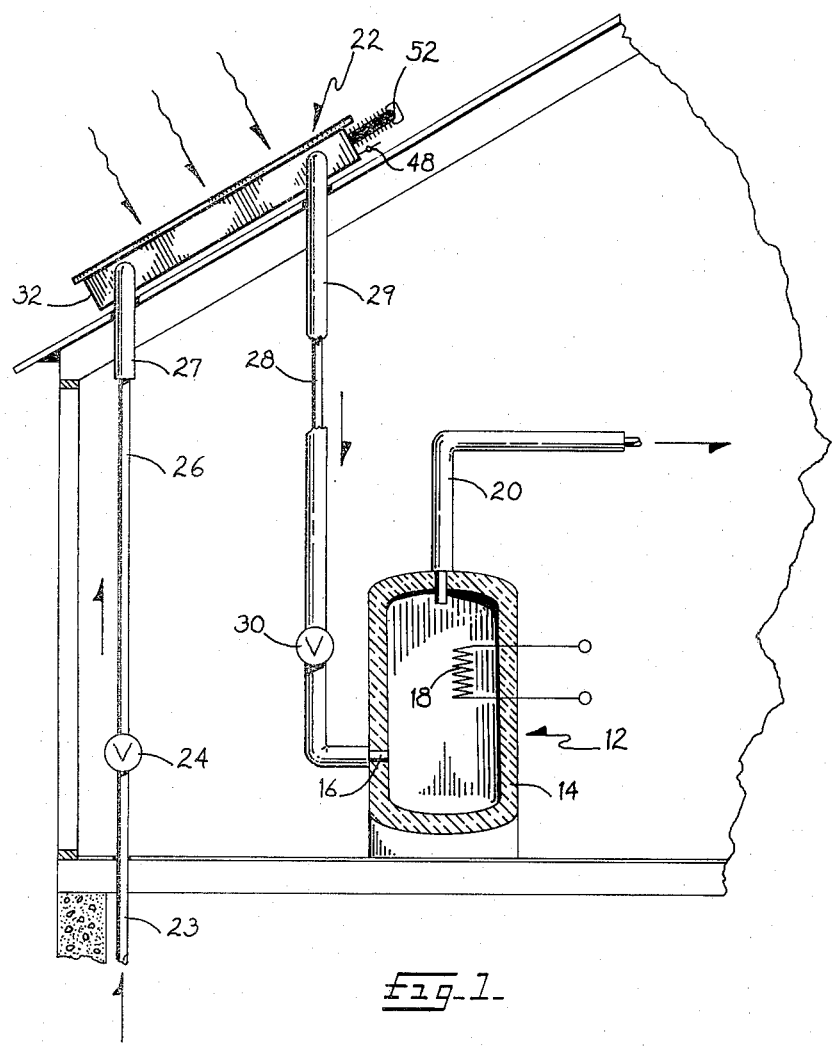
FIG. 1 is an illustration of a solar heating system embodying the present invention.

As shown in FIG. 1, hot water is stored in a conventional hot water tank 12 which is generally located in the basement or on the first floor of a building. The tank is wrapped in a heat insulating material 14.

Water supplied to the tank 12 through inlet port 16 is heated by an electrical resistance heating coil 18. The heating coil is temperature controlled to maintain a predetermined range of water temperature. As an alternative, some other heating element such as a gas flame may be provided. From the outlet 20 hot water is provided on demand at any number of taps and the like throughout the building.

In accordance with the present invention the water supplied to the conventional hot water tank 12 is first preheated in an integral storage collector 22. Water at line pressure is provided from a primary water supply line 23 through a valve 24 to a collector water inlet pipe 26. The supply line 23 is generally connected to a town water supply, and it supplies water at a pressure which obviates pumps at individual buildings.

After preheating in the integral storage collector 22 the water, still at line pressure, flows through the collector outlet pipe 28 and a valve 30 to the hot water tank inlet port 16. The valves 24 and 30 are conventional hand operated valves which are left open in normal operation of the system.

The entire length of pipe 29 is wrapped in thermal insulation 29 to reduce heat loss from the pipe. Only the length of pipe 26 exposed to a cold environment is insulated at 27. With that insulation, sufficient heat is conducted from the building and from the collector through the pipe 26 to prevent freezing of water in the pipe.

Figure 2:
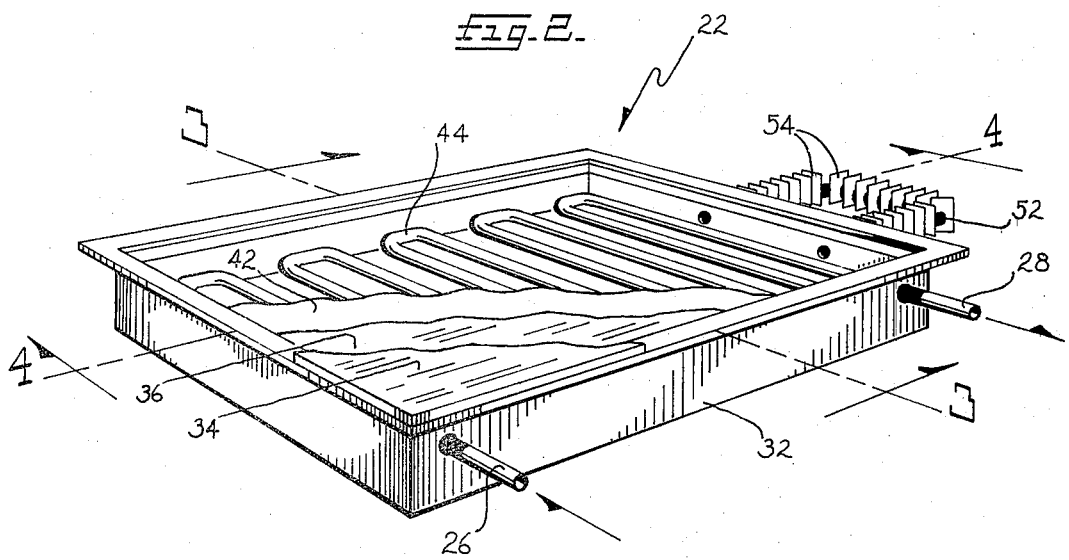
FIG. 2 is a perspective view of the solar collector of FIG. 1.
Figure 3:
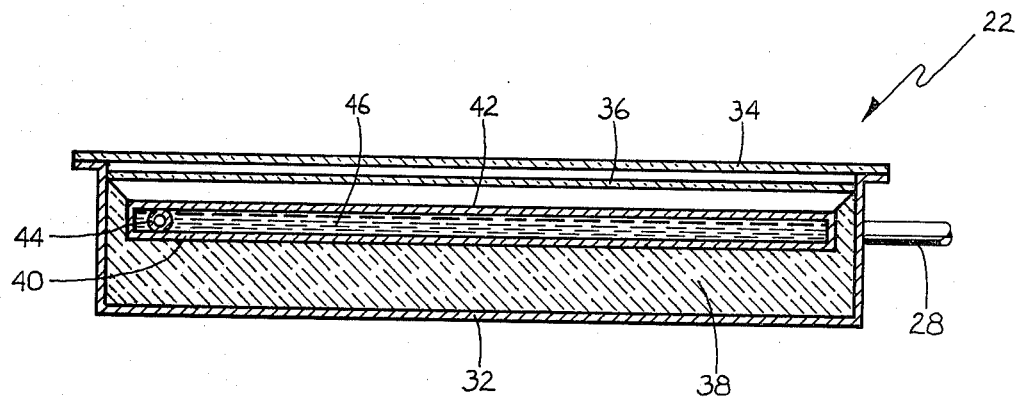
FIG. 3 is a cross sectional view of the collector of FIG. 2 taken along line 3—3.
Figure 4:
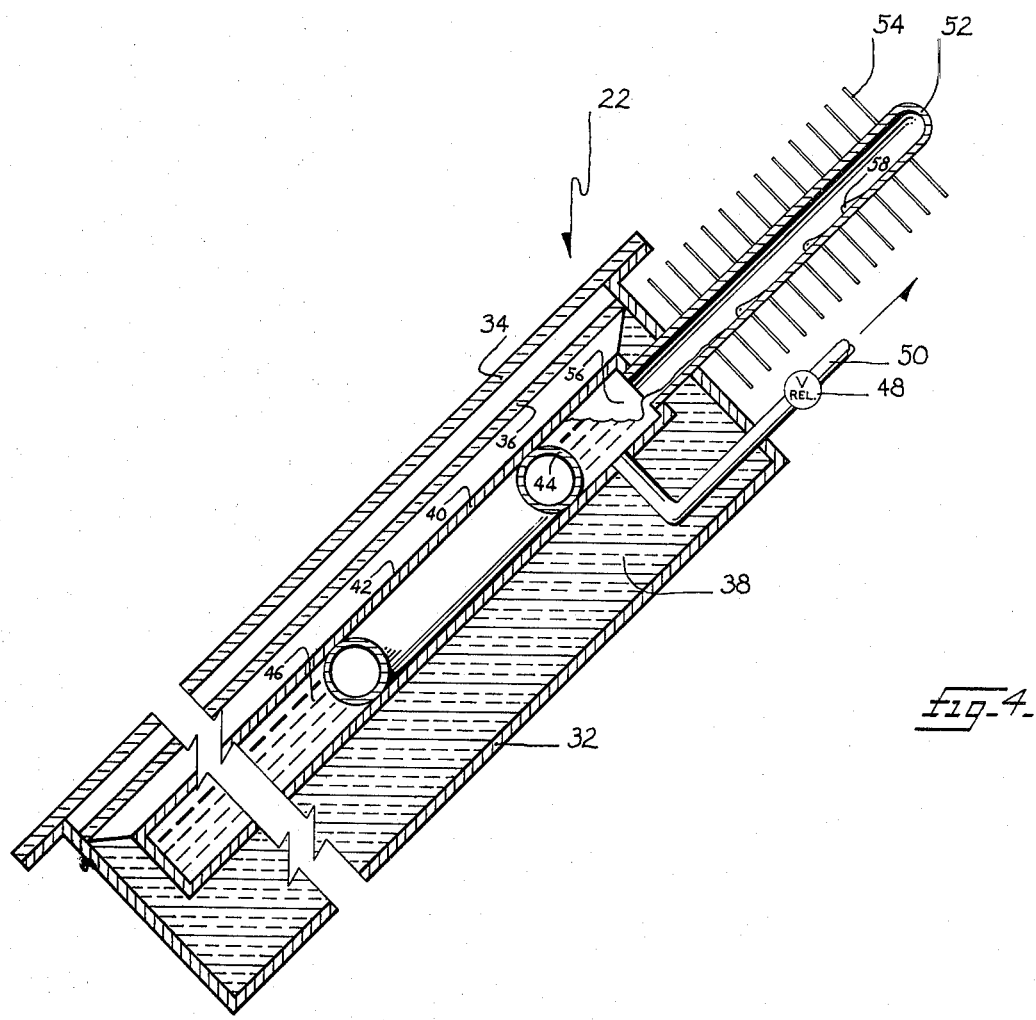
FIG. 4 is a longitudinal sectional view of the collector of FIG. 2 taken along line 4—4 and showing the heat pipe temperature control component.

The integral storage collector 22 of FIG. 1 is shown in detail in FIGS. 2, 3 and 4. The collector includes a box casing 32. The open side of the casing 32 faces the sun and is covered by an outer glass or plastic transparent plate 34. Spaced below the plate 34 is a transparent plate 36 of Teflon (a trademark for polytetrafluoroethylene). The sheets 34 and 36 are transparent to light but reflect heat.

The bottom and sides of the casing 32 are packed with a thermal insulating material 38. A flat tank 40 is seated in the insulation and has an energy absorbing surface 42 facing the transparent sheets 34 and 36. The absorbing surface 42 is coated with a flat black paint or with a selective black coating which is a good absorber of radiation in the solar spectrum but a poor emitter of infrared energy.

The heat absorbing arrangement of the collector 22 including the transparent plates 34 and 46 and the black absorbing surface 42 are conventional. Other arrangements may include any number of transparent plates as well as a convection suppression arrangement.

Tank 40 is filled with water as a heat storage medium 46. A serpentine water conduit 44 connecting the water inlet 26 and water outlet 28 is enclosed in the tank 40 and carries line water to be preheated. The water conduit 44 is copper tubing. Copper does not react with water and has a high thermal conductivity to provide good heat exchange between the heat storage medium 46 and the line water in the tubing.

Heat storage mediums other than water such as heat transfer oils may also be used; however, for several reasons water is the preferred medium. For one, water is very inexpensive and is readily available. Further, where fresh water without antifreeze is used, there is no danger of contamination of the line water. Finally, by use of water as the storage medium, freezing of the line water in the collector is avoided. At night, where the ambient temperature drops below freezing, the temperature of the water in the collector, including the storage medium, can be expected to drop to 32° F., the freezing temperature of water. But the heat of fusion which must be removed from the large mass of water at the freezing temperature before the water will freeze is substantial. Given the high thermal insulating characteristics of the storage collector, there is insufficient heat transfer from the heat storage water to freeze that water. Total freezing would only occur after days of subfreezing weather with no light, an unlikely occurrence in most regions.

Thus, because the substantial heat of fusion required to freeze the tank of water prevents the line water from freezing, the storage medium must have a fusion temperature of 32° or higher in subfreezing climate.

To avoid freezing of the heat storage medium, and thus freezing of the line water, two critical parameters must be considered: the amount of heat which must be transferred from the water to cause complete freezing and the rate of heat loss from the storage medium.

The rate of heat loss can be determined from the heat transfer coefficient U of the collector calculated with respect to the absorber surface area. Although heat is lost from other than the face of the collector, heat loss through the absorber and transparent plates is dominant. A collector having two inches of insulation behind the heat medium storage tank and two glass plates over the tank has an overall heat transfer coefficient of about 0.5 BTU/ft$^2$-°F.-hr. Thus, with the storage medium at 32° F. and the ambient temperature at 10° F., the rate of heat loss from the absorber is only about 10 BTU/ft$^2$-hr.

For very cold climates, the transfer coefficient U can be lowered to 0.3 by using an additional glass or plastic plate over the collector absorber. In warm climates a single-plate collector having a heat transfer coefficient of about 1.0 might be sufficient.

The amount of heat which must be transferred to freeze the stored water is dependent on the mass of the water. Specifically, to cool the water in the storage tank to the freezing temperature, a heat loss of 1 BTU per pound of water per °F. is required. Then, the water remains at 32° F. until the heat of fusion of 143 BTU per pound of water is transferred from the storage medium. If, for example, the storage collector contains 8 pounds of water per square foot of surface area, the heat loss from the storage collector required to freeze water at 32° F. is about 1150 BTU per square foot of collector area.

Assuming that no water flows through the collector and that the solar flux to the collector is zero, the time required to freeze 32° F. water in the collector at any ambient air temperature can be determined from the equation $$U \times (32 - Ta) \times t = 143 \times M$$

where U is the overall heat transfer coefficient in BTU/ft$^2$-°F.-hr., Ta is the ambient air temperature in °F., M is the weight of water in lb/ft$^2$ and t is the time to freeze in hours.

Thus, assuming a U factor of 0.5 and ambient temperature of 10° F., about 115 hours is required to totally freeze the heat storage medium after the temperature of the medium has been reduced to 32° F. Note that even this lengthy period of time is based on an assumption of no solar flux. However, even a small amount of solar energy in the range of 20 to 50 BTU/hr-ft$^2$ is available even on cloudy days. And particularly cold weather is generally accompanied by relatively clear sky conditions resulting in even higher solar flux. Thus, in most parts of the country any partial freezing which occurs at night will be countered during the day by the solar energy absorbed. As a practical matter, water contained in the integral storage collector will not totally freeze.

From the above equation for determining the length of time required to totally freeze the storage medium, one can define a freezing time ratio as M/U. From that ratio it can be seen that one can increase the time for freezing, and thus decrease the likelihood of total freezing, by either making the mass of water per unit area large or the heat transfer coefficient low. To prevent freezing in southern climates where the water is subject to freezing such as in Atlanta or Dallas, a freezing time ratio of about 8 lb-hr-°F./BTU in sufficient. In substantially colder climates such as in Boston and Chicago a freezing time ratio of at least about 16 is required.

When one intends to use water as the storage medium, a useful design parameter is a volumetric freezing time ratio V/U where V is the storage tank volume per collector surface area. Because one gallon of water is about eight pounds, the ratios M/U and V/U are directly related. The minimum volumetric freezing time ratio for Atlanta or Dallas is thus about one gallon-hr-°F./BTU and that for Boston and Chicago is about 2.

The amount of water stored in the collector is also dependent on the heat storage capacity required for significant preheating of the line water. For household use, from about ½ gallon per square foot to 2½ gallons per square foot is sufficient. One can select the volume of water stored in the collector from that range. This sets the values of M and V. Then, to attain the necessary freezing time ratio, one need only set the heat transfer coefficient. To reduce collector cost, that coefficient should be set at the lowest value possible while still avoiding freezing for a particular climate.

Other practical design considerations also affect the choice of M and V. Increasing those parameters requires a deeper absorber panel and that increases collector costs. Also, increasing those parameters tends to decrease the high temperature attained by the storage medium during sunny periods.

A 0.8 gallon/ft$^2$ integral storage collector having a storage tank of about 3 feet by 6 feet by 1 inch and having a thermal transfer coefficient of 0.5 has been tested for a year in the Boston area. During that period only partial freezing along the tank walls has occurred despite subzero °F. weather; and there has been no resultant damage to the collector.

Insolation of the line water from the storage medium by means of the serpentine tubing 44 in the collector is required for several reasons. For one, the line pressure is as much as 100 pounds per square inch. Tank construction necessary to withstand such high pressures would be exceptionally costly. Another advantage is that it provides a closed volume of heat storage medium. This is particularly advantageous where water is used as the storage medium because the continued introduction of impurities to the tank is avoided. Thus, the tank may be of steel and need not be lined with plastic, ceramic or the like. Such a liner is generally required in a water storage tank in which water is continuously introduced because the fresh impurities react with the tank. A final reason for the use of tubing 44 is that partial freezing is likely in the storage medium during extreme weather conditions. However, that freezing occurs first along the side walls of the tank. With the line water, carried by tubes 44, set in from the side walls that water is the last to freeze in the tank. Thus, there is no danger of ice breaking loose to form an ice dam in the line.

During periods when heat is not extracted from the heat storage medium, that is when tap water is not being drawn through the system, the daytime temperature of the water could reach 300° to 400° F. The tank construction which would be required to withstand such high temperatures and the resultant high pressure is expensive. Thus pressure relief means are provided.

In regions where such high temperatures are not likely, a simple pressure release valve 48 may be used. The valve is in fluid communication with the heat storage medium through a port 50. If the pressure in the tank 40 were to build up to some predetermined level, for example in the order of two atmospheres, the valve 48 would open and pressurized fluid would be expelled. Unless an overflow tank were used in conjunction with the valve 48, the tank 40 would then have to be refilled.

Where over-temperature conditions are likely, some other means for controlling the temperature and thus the pressure of the heat storage water is preferred. For that purpose, a heat pipe 52 shown in FIGS. 2 and 4 is provided at the upper end of the heat storage tank. Although shown as a U-shaped tube connected at each end to the tank 40, the heat pipe may be a straight or bent tube closed at one end. Heat conducting fins 54 are spaced along the tube 52.

At the usual operating temperatures of the storage collector, that is at about 130° F. to 150° F., there is little vapor in the space 56 over the heat storage water 46. Thus, heat losses through the pipe 52 result only from heat conduction through the dry air and the sides of the tube. Those heat losses are insignificant. However, when the temperature of the water in tank 40 approaches the vaporization temperature, or boiling temperature, of water at 212° F., the tube 52 is converted into a simplified heat pipe. Water vapor fills the pipe 52, is cooled by heat transfer into the environment, and condenses. The cooled, condensed liquid 58 then flows back into the tank 40 as return condensate. Thus, as in a conventional heat pipe, there is a natural convection of hot vapor toward the cold end of the pipe with the flow of condensate back to the hot end of the pipe. The substantial heat of vaporization is extracted from the vapor and passed to the cool environment.

The tube 52 acts as a heat pipe only at about the vaporization temperature of the water. Thus, substantial heat leakage is provided at about that temperature to prevent continued rise in the temperature of the water, but there are only insignificant heat losses in the normal operating range of the storage collector.

In order to avoid the occurrence of a pocket of dry air remaining in the heat pipe even when the water vaporizes, a plug of gas permeable, moisture impermeable material may be positioned at the upper end of the heat pipe. With increased pressure the wet air forces dry air through the plug and fills the heat pipe.

The heat pipe 52 need not be opened to the vapor space 56 if a quantity of water or other vaporizable fluid were contained in the heat pipe. That alternative would allow for adjustment of the heat leakage temperature. By choosing a heat pipe fluid having a vaporization temperature other than 212° F. or by pressurizing or drawing a vacuum in the pipe, the leakage temperature could be set at any desired level.

As noted above, some heat storage and transfer fluid other than water may be used in the tank 40. If the vaporization temperature of such a medium were higher than any temperature possibly encountered in the storage collector, the pressure relief valve 48 and the heat pipe 51 may not be required. Such a heat storage and transfer fluid would be more expensive and would present the possibility of contamination of the line water. However, contamination is less likely than in conventional systems in which the heat transfer fluid is pumped into heat exchange relationship with the water. In the present case the water is under pressure, and the heat transfer fluid is preferably held at near one atmosphere pressure. Thus, leakage would be from the line water into the heat transfer fluid rather than vice versa.

In operation, the water 46 in the tank 40 is heated by the solar energy absorbing surface 42. The water is usually heated to a temperature within the range of 130° F. to 150° F. When hot water is not drawn from the system, line water sits in the tubing 44 and is heated to the temperature of the storage medium. On demand from taps on line 20, hot water is drawn from the hot water tank 14. With that, preheated water from the storage collector 22 is forced by line pressure into the tank 14 where it may be further heated if necessary. The initial volume of water drawn from the collector 22 may be within the range of 130° F. to 150° F. and require no further heating. Additional water forced through the collector from the line 23 is preheated by heat exchange with the storage medium 46. The large heat exchange area provided by the serpentine, high conductivity tubing 44 provides sufficient preheating of the flowing water to substantially reduce the amount of heating required by the resistance coil 18. The demand for water is normally in brief intervals of no more than three minutes and the heat stored rebuilds sufficiently between intervals for subsequent preheating of the line water.

It is recognized that on cold nights the heat storage water in tank 40 may cool below the temperature of the line water and result in negative preheating. However, the period during which the temperature in the tank 40 is low corresponds to the normal period of lowest hot water demand. Tests show that substantial preheating of hot water is provided from the late morning to several hours after dusk even during winter months, and any heat losses encountered at night and early morning are countered by high system efficiency during the daytime. Heating of the heat storage medium is direct and heat exchange losses associated with conventional systems are thereby reduced.

Tests indicate that the system can provide 40 to 60% of the heating requirement for a home hot water system at about half of the installation cost of prior comparable systems. Further, reliability is increased and maintenance costs are reduced because of the absence of a pump and control circuitry.

While the invention has been particularly shown and described with reference to a preferred embodiment thereof, it will be understood by those skilled in the art that various changes in form and details may be made therein without departing from the spirit and scope of the invention as described by the appended claims.

INDUSTRIAL APPLICABILITY

The invention is applicable in any solar heating system for heating water. It has its prime utility as a preheating unit to a conventional water heating system.

I claim:

1. A solar heating system for heating water comprising:
    an integral storage collector exposed to solar illumination, the storage collector including absorber means for absorbing solar energy, a heat storage medium of large heat capacity and high thermal conductivity directly heated by said absorber means, and a water flow path in heat exchange relationship with the heat storage medium;
    a water outlet from said water flow path connected as a pressurized, heated water supply; and
    a water inlet to said water flow path connected to a primary pressurized water supply line such that line pressure forces fresh water through the water flow path of the integral storage collector as heated water is taken from the water outlet.

2. A solar heating system as claimed in claim 1 wherein the heat storage medium is a liquid having a fusion temperature of at least 32° F.

3. A solar heating system as claimed in claim 2 wherein the heat storage medium is water.

4. A solar heating system as claimed in claim 3 wherein the collector has a freezing time ratio M/U of at least about 8 pound-hour-°F./BTU where M is the weight of water in pounds per square foot of absorber surface area and U is the heat transfer coefficient of the collector in $BTU/ft^2$-°F.-hr.

5. A solar heating system as claimed in claim 4 wherein the freezing time ratio M/U is at least about 16 pound-hour-°F./BTU.

6. A solar heating system as claimed in claim 1 further comprising a pressure relief means for preventing excessive pressure buildup of the heat storage medium.

7. A solar heating system as claimed in claim 6 wherein the pressure relief means is a heat pipe.

8. A solar heating system as claimed in claim 7 wherein the heat storage medium is a liquid and the heat pipe is opened at one end to the heat storage liquid.

9. A solar heating system as claimed in claim 8 wherein the heat storage liquid is water.

10. A solar heating system as claimed in claim 6 wherein the pressure relief means is a pressure responsive valve.

11. A solar heating system as claimed in claim 1 wherein the water outlet from said water flow path is connected to the inlet port of a hot water heater.

12. A solar collector for heating water comprising:
    absorber means for absorbing solar energy;
    a heat storage medium directly heated by said absorber means, the storage medium having a fusion temperature which is about the same as and not less than the fusion temperature of water;
    a water flow path in heat exchange relationship with the heat storage medium; and
    thermal insulation insulating the side of the heat storage medium opposite the absorber means.

13. A solar collector as claimed in claim 12 wherein the heat storage medium is water.

14. A solar collector as claimed in claim 13 wherein the collector has a freezing time ratio M/U of at least about 8 pound-hour-°F./BTU where M is the weight of water in pounds per square foot of collector surface area and U is the heat transfer coefficient of the collector in $BTU/ft^2$-°F.-hr.

15. A solar collector as claimed in claim 14 wherein the freezing time ratio M/U is at least about 16 pound-hour-°F./BTU.

16. A solar collector as claimed in claim 12 further comprising a pressure relief means for preventing excessive pressure buildup of the heat storage medium.

17. A solar collector as claimed in claim 16 wherein the pressure relief means is a heat pipe.

18. A solar collector as claimed in claim 17 wherein the heat storage medium is a liquid and the heat pipe is opened at one end to the liquid.

19. A solar collector as claimed in claim 18 wherein the heat storage liquid is water.

20. A solar collector as claimed in claim 16 wherein the pressure relief means is a pressure responsive valve.

21. A solar collector for heating water comprising:
    absorber means for absorbing solar energy;
    a storage tank for holding a volume of heat storage liquid directly heated by the absorber means; and
    a water conduit through the storage tank;
    the freezing time ratio of V/U being at least about one gallon-hour-°F./BTU, where V is the volume of the storage tank per absorber surface area in gallons/square foot and U is the collector heat transfer coefficient in BTU/ft$^2$-°F.-hr.

22. A solar collector as claimed in claim 21 wherein the storage tank is filled with a heat storage liquid having a fusion temperature of at least 32° F. and heat of fusion of at least 140 BTU per pound.

23. A solar collector as claimed in claim 22 wherein the heat storage liquid is water.

24. A solar collector as claimed in claim 21 wherein the freezing time ratio V/U is at least about two gallon-hour-°F./BTU.

25. A solar collector having a heat transfer liquid therein heated by absorbed solar energy and further comprising:
a heat pipe extending from adjacent the heat transfer fluid into a relatively low temperature region to act as a large heat leak from the heat transfer fluid at about the temperature of vaporization of a heat pipe fluid.

26. A solar collector as claimed in claim 25 wherein the heat pipe is opened at the end adjacent the heat transfer fluid and the heat pipe fluid is the heat transfer fluid.

27. A solar collector as claimed in claim 26 wherein the heat transfer fluid is water.

28. A method of heating water comprising:
providing a solar collector having a heat storage medium therein and a water conduit in heat exchange relationship with the heat storage medium;
exposing the solar collector to solar illumination; and directing line water at line pressure through the water conduit of the solar collector.

29. A method of heating water as claimed in claim 28 wherein the heat storage medium is water and the solar collector has a freezing time ratio M/U of at least about 8 pound-hour-°F./BTU where M is the weight of water in pounds per square foot of absorber surface area and U is the heat transfer coefficient of the collector in BTU/ft$^2$-°F.-hr.

30. A method of heating water as claimed in claim 29 wherein the freezing time ratio M/U is at least about 16 pound-hour-°F./BTU.

31. A method of preventing freezing of water in a solar collector comprising providing a mass of water in the collector having a freezing time ratio of M/U of at least about 8 pound-hour-°F./BTU where M is the weight of water in pounds per square foot of collector surface area and U is the heat transfer coefficient of the collector in BTU/ft$^2$-°F.-hr.

32. A method of preventing freezing as claimed in claim 31 wherein the freezing time ratio M/U is at least about 16 pound-hour-°F./BTU.

33. A method of preventing freezing of water in a solar collector located where the water is subject to freezing comprising providing a mass of water in the collector having a freezing time ratio of M/U selected according to worst case regional climatic conditions to prevent freezing, where M is the weight of water per absorber surface area and U is the heat transfer coefficient of the collector.

* * * * *